United States Patent

Borowski et al.

[11] 3,921,184
[45] Nov. 18, 1975

[54] COMPENSATION OF RESPONSE SLUGGISHNESS OF PHOTOELEMENTS EMPLOYED IN AUTOMATIC EXPOSURE TIMERS

[75] Inventors: Kurt Borowski; Friedrich Stumpf, both of Munich; Eduard Wagensonner, Aschheim, all of Germany

[73] Assignee: Agfa-Gevaert AG, Leverkusen, Germany

[22] Filed: May 8, 1974

[21] Appl. No.: 468,134

[30] Foreign Application Priority Data
May 10, 1973 Germany............................ 2323557

[52] U.S. Cl. .................... 354/32; 354/51; 354/149
[51] Int. Cl.² ....................... G03B 7/08; G03B 7/16
[58] Field of Search ............. 354/32, 34, 35, 48, 50, 354/51, 60, 149

[56] References Cited
UNITED STATES PATENTS

| | | | |
|---|---|---|---|
| 3,326,103 | 6/1967 | Topaz | 354/34 |
| 3,504,602 | 4/1970 | Kiper | 354/35 |
| 3,535,989 | 10/1970 | Kitai | 354/32 |
| 3,611,895 | 10/1971 | Albedyll | 354/32 |

Primary Examiner—Joseph F. Peters, Jr.
Attorney, Agent, or Firm—Michael S. Striker

[57] ABSTRACT

A photographic camera is adapted for making exposures with and also without a photoflash unit. A photosensitive unit is operative for detecting scene brightness, but exhibits a disadvantageous time delay in the detection of a sudden scene brightness increase such as occurs when a photoflash unit produces a flash. An automatic exposure timing arrangement is operative for automatically selecting the time duration of an exposure in dependence upon the scene brightness detected by the photosensitive unit during the making of the exposure. An exposure-type selector has a first setting for photoflash exposures and a second setting for natural-light and other exposures. A compensation arrangement is operative for counteracting the effect of the aforementioned time delay upon the operation of the timing arrangement, in order to counteract any tendency of the timing arrangement to select too long an exposure time when the camera makes a photoflash exposure. The compensation arrangement includes an exposure-shortening device operative for causing the timing arrangement to automatically select shorter exposure times when the exposure-type selector is in the first setting than when the exposure-type selector is in the second setting.

6 Claims, 2 Drawing Figures

COMPENSATION OF RESPONSE SLUGGISHNESS OF PHOTOELEMENTS EMPLOYED IN AUTOMATIC EXPOSURE TIMERS

BACKGROUND OF THE INVENTION

The present invention relates to photographic cameras of the type which include an electronic automatic exposure timing arrangement, especially of the type comprised of a photosensitive means, a timing or integrating capacitor, a voltage-detecting circuit such as a Schmitt trigger, and means for terminating an exposure, such as a shutter-control electromagnet. More specifically, the present invention relates to photographic cameras which include an automatic exposure timing arrangement and which are adapted for the making of exposures with a cooperating photoflash unit but also without such photoflash unit.

In general, most light-sensitive elements, particularly photoresistors, are characterized by a sluggish response to sudden changes in scene brightness, so that a sudden change of scene brightness such as occurs when a photoflash unit produces a flash will produce a corresponding change of the electrical output signal of the photoresistor only after elapse of a certain undesirable dead time. This sluggishness of response is particularly disadvantageous when the photosensitive element is employed in the automatic exposure timing arrangement of a photographic camera, particularly of the type which is operative for automatically selecting the time duration of an exposure in dependence upon the scene brightness detected by the photosensitive element during the actual making of the exposure.

For example, if an exposure is taken using a photoflash unit, the initial sudden scene brightness increase will not have its full effect upon the automatic exposure timing circuit until after elapse of the dead time exhibited by the photosensitive element. Accordingly, the automatically selected duration of the exposure will tend to be too long.

SUMMARY OF THE INVENTION

It is accordingly the general object of the invention to provide a photographic camera with an automatic exposure timing arrangement which operates in such a manner that the sluggishness of the response of the photosensitive element employed therein to sudden scene brightness changes is effectively compensated.

This object, and others which will become more understandable from the description, below, of specific embodiments, can be met, according to one advantageous concept of the invention, by providing, in a photographic camera of the type adapted for making exposures with and also without a photoflash unit, in combination, photosensitive means operative for detecting scene brightness but exhibiting a time delay in the detection of a sudden scene brightness increase such as occurs when a photoflash unit produces a flash; an automatic exposure timing arrangement operative for automatically selecting the time duration of an exposure in dependence upon the scene brightness detected by the photosensitive means during the making of the exposure; and exposure-type selecting means having a first setting for photoflash exposures and a second setting for other exposures, such as natural-light exposures, and the like. According to the invention there is provided compensation means operative for counteracting the effect of the time delay upon the operation of the timing arrangement, in order to counteract any tendency of the timing arrangement to select too long an exposure time when the camera makes a photoflash exposure. The compensation means includes exposure-shortening means operative for causing the timing arrangement to automatically select shorter exposure times when the exposure-type selecting means is in the first setting than when the exposure-type selecting means is in the second setting.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
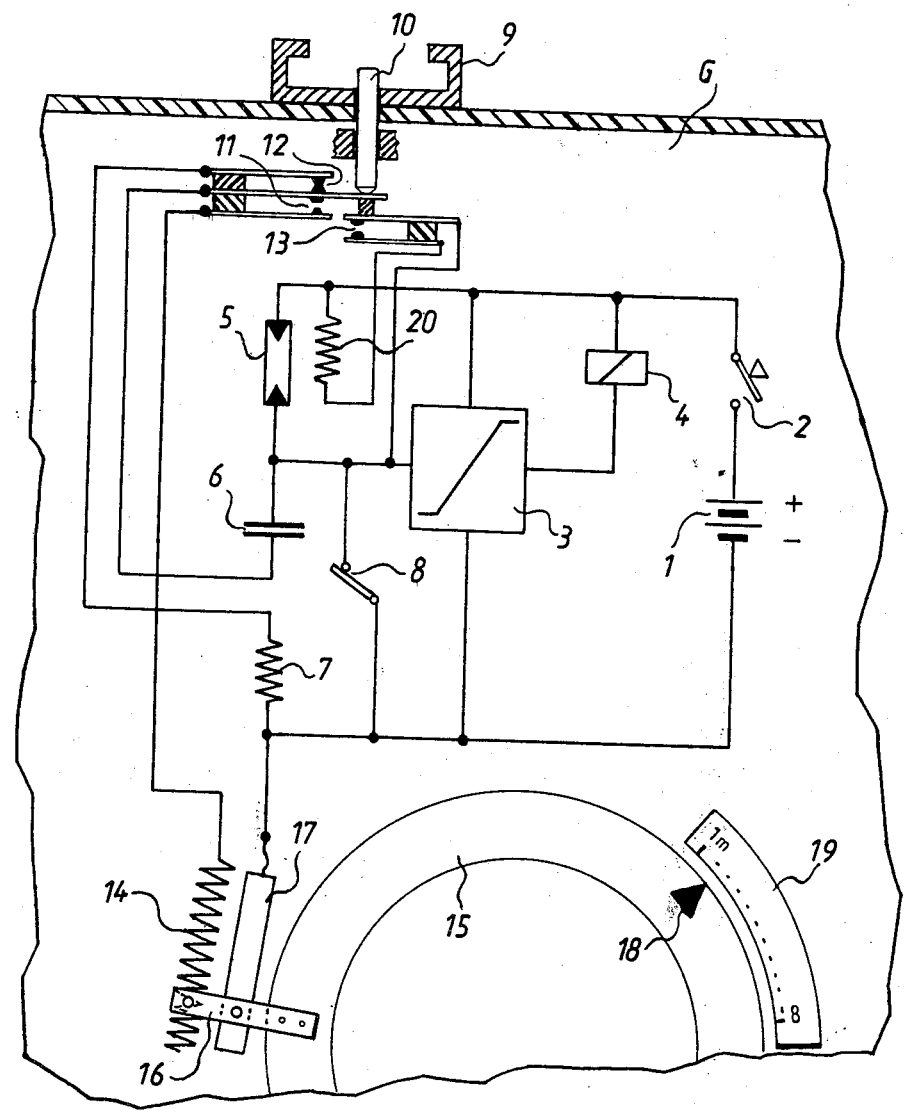
FIG. 1 depicts a first exemplary embodiment of the invention.

In FIG. 1, reference character G designates the housing of a partially illustrated camera in which there is located an automatic exposure timing arrangement. Reference numeral 1 designates a voltage source. Reference numeral 2 designates a main switch which is operative for connecting the voltage source to, or alternatively disconnecting the source from, the illustrated circuitry, for example when the shutter-release button is being depressed but just before the shutter actually opens. Reference numeral 3 designates a voltage-detecting circuit, or comparator, such as a conventional Schmitt trigger circuit. Reference numeral 4 designates a shutter-control electromagnet. Reference numeral 5 designates a photoresistor. Reference numeral 6 designates an integrating or timing capacitor. Reference numeral 7 designates a simple resistor. Reference numeral 8 designates a start switch which is normally closed, but which opens at the start of an exposure; for example, switch 8 can be mechanically coupled to the shutter or to one of the mechanical parts which are connected to the shutter.

Mounted on the camera housing G is a supporting bracket 9 into which can be slid the foot of a non-illustrated photoflash unit, when the photoflash unit is to be mounted on the camera housing G. Projecting into the space which is occupied by such slide-in foot of the non-illustrated photoflash unit is a detector pin 10, which evidently becomes depressed when the photoflash unit is slid into mounted position. The pin 10 activates the moving middle contact of a two-position switch 11, 12, and also activates a switch 13. This detector pin 10 in the illustrated embodiment constitutes exposure-type selecting means having a first setting (depressed) for the making of a photoflash exposure, and having a second setting (undepressed) for the making of another type of exposure, for example using natural light. The exposure-type selecting means 10 need not be automatically responsive to the presence or absence of the photoflash unit, although this is very advantageous; the selecting means 10 could instead be manually set by the user of the camera.

When the photoflash unit is not mounted in place on the camera housing G, the pin 10 is undepressed, and the middle moving contact of switch 11, 12 engages the upper contact 12 (as shown in FIG. 1), so that the resistor 7 is connected in series with the timing capacitor 6 across the input of the voltage-detecting means 3. Also, the switch 13 is open.

When the photoflash unit is mounted in place on the camera housing G, the pin 10 is depressed, and the middle moving contact of switch 11, 12 engages the lower contact 11. As a result, the resistor 7 is no longer connected in circuit with timing capacitor 6; instead, a variable resistor 14 is connected in series with the timing capacitor 6. The resistance of variable resistor 14 changes in automatic dependence upon the setting of the distance selector 15.

Specifically, a wiper 16 mechanically coupled with the distance selector ring 15 connects the engaged portion of the resistor 4 to a contact strip 17, the contact strip 17 being electrically connected to the negative terminal of the voltage source 1. The distance selector ring 15 is provided with a marker 18 which points to different indicia on a calibrated distance scale 19.

When the distance selector ring 15 is moved to the position corresponding to the smallest subject distance, the resistance of variable resistor 14 assumes the largest value in its range of values. As the selected distance is decreased, the resistance of resistor 14 increases; in other words, the resistance of resistor 14 and the selected distance are inversely related.

The operation of the arrangement depicted in FIG. 1 is as follows:

The shutter-release button is depressed. Before it is depressed the full way to actually effect shutter opening, it causes switch 2 to close. As the shutter-release button is depressed all the way to the actual shutter-opening position, switch 8 opens, so that the voltage applied across the input of voltage-detecting means 3 will no longer be zero. If the detector pin 10 is in the illustrated undepressed condition, then there is connected across the input of voltage-detecting means 3 the series combination of timing capacitor 6 and resistor 7. This series combination forms the first branch of a voltage divider, the second branch of which is constituted by the photoresistor 5. This voltage divider is connected across the voltage source 1. When the shutter is opened and the switch 8 opens, the initial voltage across capacitor 6 will be zero. However, the initial voltage applied across the input of voltage-detecting means 3 will not be zero; rather, it will have a value determined by the voltage division between the two resistors 5 and 7. During the making of the exposure, scene-brightness-dependent current flows through capacitor 6, causing the capacitor voltage to increase. Eventually, the voltage across the input of voltage-detecting means 3 reaches a predetermined value, in response to which the output voltage of means 3, applied across the shutter-control electromagnet 4, changes to a value causing the shutter to close, thereby ending the exposure. The switches 8 and 2 reassume their illustrated position, for example in response to manual release of the depressed shutter-release button, or else in response to the closing of the shutter itself, or in other known manner.

When the photoflash unit is mounted in place on the housing G, and the detector pin 10 is depressed, the variable resistor 14 instead of the resistor 7 is now connected in series with timing capacitor 6, in the manner described earlier. The operation of the automatic timing operation, as just described, is essentially the same, with the following differences. Firstly, the resistance of resistor 14 will be greater than that of the resistor 7. Accordingly, at the start of the exposure when start switch 8 first opens, the different voltage division now resulting from resistors 5 and 14 and uncharged capacitor 6, will result in the application of a higher initial voltage across the input of voltage-detecting means 3. Moreover, the value of this initial voltage will be dependent upon the setting of the distance selector 15. When the operation of the automatic timing arrangement during the making of a photoflash exposure is not properly compensated to take into account the sluggish response of the photoelement to the sudden scene brightness increase resulting from the flash production the duration of the exposure is too long, by a time interval which depends, inter alia, upon the distance of the subject from the camera. According to the inventive embodiment of FIG. 1, the resistance of resistor 14 will have a subject-distance-dependent value such as to shorten the exposure duration by a time interval corresponding very closely to the excess time interval just mentioned, so that the exposure will be of the correct duration.

It is to be noted that the replacement of resistor 7 by resistor 14 does effect a change in the charging time constant of timing capacitor 6. However, the change of time constant is not the predominant factor in shortening the exposure time. The predominant factor in the shortening of the exposure time is the change in the initial voltage applied across the input of the voltage-detecting means 3 when the shutter and the start switch 8 are first opened. When the selected subject distance is shorter, the shortening of the exposure time by the compensation arrangement is greater; conversely, when the selected subject distance is greater, the shortening of the exposure time by the compensation arrangement is smaller.

When the photoflash unit is mounted in place and pin 10 is depressed, switch 13 is closed, as mentioned before, thereby connecting resistor 20 in parallel with photoresistor 5. Resistor 20 has the purpose of placing an upper limit on the effective value of the resistance of the photoresistor 5. The resistor 20 begins to be effective in particular when the resistance of photoresistor 5 exceeds the resistance of resistor 20.

Figure 2:
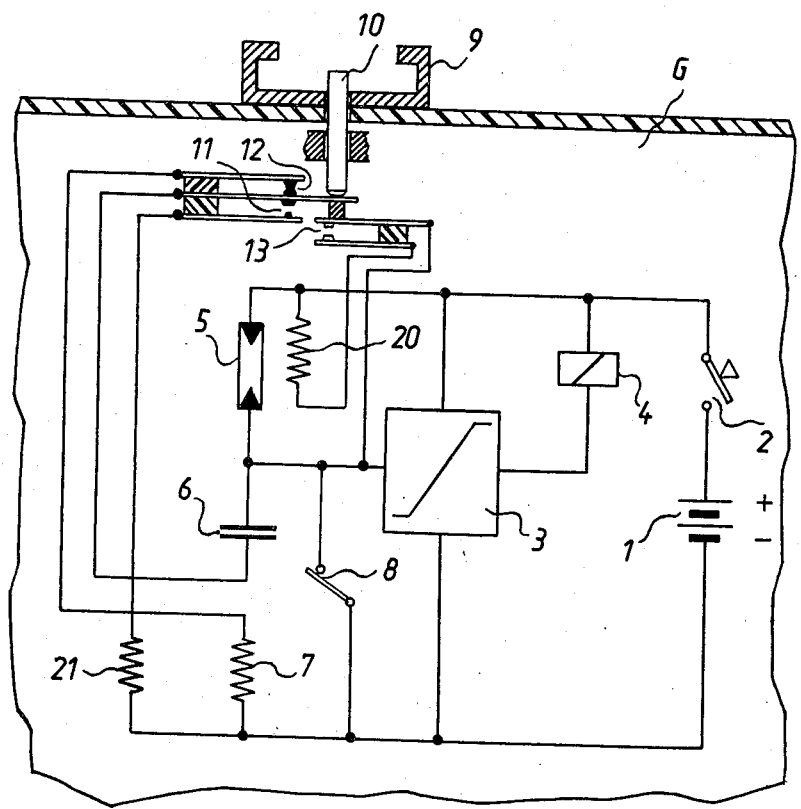
FIG. 2 depicts a second exemplary embodiment of the invention.

The embodiment depicted in FIG. 2 is very similar to that shown in FIG. 1, corresponding components being designated by the same reference numerals. However, in the embodiment of FIG. 2, the camera is not provided with means for selecting the subject distance; accordingly the resistor 21, which replaces resistor 7 when a photoflash exposure is to be made, is a fixed resistor.

It will be understood that each of the elements described above, or two or more together, may also find a useful application in other types of circuits and constructions differing from the types described above.

While the invention has been illustrated and described as embodied in a photographic camera including an automatic exposure timing arrangement employing photosensitive means which exhibits an undesired sluggishness of response to sudden scene light increases such as result from the flashing of a photoflash unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera of the type adapted for making exposures with and also without a photoflash unit, in combination, photosensitive means operative for detecting scene brightness but exhibiting a time delay in the detection of a sudden scene brightness increase such as occurs when a photoflash unit produces a flash; exposure-type selecting means having a first setting for photoflash exposures and a second setting for other exposures; an automatic exposure timing arrangement operative for automatically selecting the time duration of an exposure in dependence upon the scene brightness detected by said photosensitive means during the making of the exposure, both when said exposure-type selecting means is in said first setting and when said exposure-type selecting means is in said second setting; and compensating means operative for counteracting the effect of said time delay upon the operation of said timing arrangement in order to counteract any tendency of said timing arrangement to select too long an exposure time when the camera makes a photoflash exposure, said compensating means comprising exposure-shortening means operative for causing said timing arrangement to automatically select shorter scene-brightness-dependent exposure times when said exposure-type selecting means is in said first setting than when said exposure-type selecting means is in said second setting.

2. In a photographic camera as defined in claim 1, wherein said automatic exposure timing arrangement comprises exposure-terminating means activatable for terminating an exposure, voltage-detecting means having an output across which is connected said exposure-terminating means and having an input and operative for activating said exposure-terminating means when the voltage across said input reaches a predetermined value, a voltage source, a timing capacitor stage including at least one timing capacitor, and connecting means operative during an exposure of either type for connecting together said voltage source, said photosensitive means and said timing capacitor circuit to cause a flow of scene-brightness-dependent current through said timing capacitor to cause said timing capacitor stage to apply to said input of said voltage-detecting means a voltage dependent upon the voltage across said timing capacitor and changing at a scene-brightness-dependent rate from an initial value to said predetermined value, and wherein said exposure-shortening means comprises means operative for establishing an initial value of the voltage across said input of said voltage-detecting means which is nearer to said predetermined value when said exposure-type selecting means is in said first setting than when said exposure-type selecting means is in said second setting.

3. In a photographic camera as defined in claim 1, wherein said automatic exposure timing arrangement comprises exposure-terminating means activatable for terminating an exposure, voltage-detecting means having an output across which is connected said exposure-terminating means and having an input and operative for activating said exposure-terminating means when the voltage across said input reaches a predetermined value, a voltage source, and a timing capacitor, and wherein said photosensitive means comprises a photoelement, and wherein said photoelement and said timing capacitor are connected in series across said voltage source to form a voltage divider having two branches, one of the branches including said photoelement and the other of said branches including said timing capacitor, one of said branches being connected across said input of said voltage-detecting means, and wherein said exposure-shortening means comprises means for varying the resistance of the voltage divider branch which includes said timing capacitor in dependence upon the setting of said exposure-type selecting means.

4. In a photographic camera as defined in claim 1, further including distance-setting means, and wherein said exposure-shortening means comprises means operative when said exposure-type selecting means is in said first setting for effecting an exposure-time shortening which varies inversely to the distance for which said distance-setting means is set.

5. In a photographic camera as defined in claim 1, wherein said automatic exposure timing arrangement comprises exposure-terminating means activatable for terminating an exposure, voltage-detecting means having an output across which is connected said exposure-terminating means and having an input and operative for activating said exposure-terminating means when the voltage across said input reaches a predetermined value, a voltage source, and a timing capacitor, and wherein said photosensitive means comprises a photoelement, and wherein said photoelement and said timing capacitor are connected in series across said voltage source to form a voltage divider having two branches, one of the branches including said photoelement and the other of said branches including said timing capacitor, one of said branches being connected across said input of said voltage-detecting means, and wherein said exposure-shortening means comprises means for varying the ratio of the resistances of said branches in dependence upon the setting of said exposure-type selecting means.

6. In a photographic camera of the type adapted for making exposures with and also without a photoflash unit, in combination, photosensitive means operative for detecting scene brightness but exhibiting a time delay in the detection of a sudden scene brightness increase such as occurs when a photoflash unit produces a flash; an automatic exposure timing arrangement operative for automatically selecting the time duration of an exposure in dependence upon the scene brightness detected by said photosensitive means during the making of the exposure; exposure-type selecting means having a first setting for photoflash exposures and a second setting for other exposures; and compensation means operative for counteracting the effect of said time delay upon the operation of said timing arrangement in order to counteract any tendency of said timing arrangement to select too long an exposure time when the camera makes a photoflash exposure, said compensation means comprising exposure-shortening means operative for causing said timing arrangement to automatically select shorter exposure times when said exposure-type selecting means is in said first setting than when said exposure-type selecting means is in said second setting, further including distance-setting means, and wherein said exposure-shortening means comprises means operative when said exposure-type selecting means is in said first setting for affecting an exposure- time shortening which varies inversely to the distance for which said distance-setting means is set.

* * * * *